United States Patent [19]

Rawlings et al.

[11] Patent Number: 5,081,848
[45] Date of Patent: Jan. 21, 1992

[54] GROUND SOURCE AIR CONDITIONING SYSTEM COMPRISING A CONDUIT ARRAY FOR DE-ICING A NEARBY SURFACE

[76] Inventors: John P. Rawlings, 2636 SW. 90th Pl., Oklahoma City, Okla. 73159; Michael E. Albertson, 11920 Skyway Ave., Oklahoma City, Okla. 73162

[21] Appl. No.: 610,187

[22] Filed: Nov. 7, 1990

[51] Int. Cl.$^5$ ............... F25B 27/00; F25B 29/00
[52] U.S. Cl. .................... 62/260; 62/238.6; 165/45
[58] Field of Search ............. 62/260, 81, 82, 238.6; 165/45

[56] References Cited

U.S. PATENT DOCUMENTS

| | | | |
|---|---|---|---|
| 2,461,449 | 2/1949 | Smith | 237/1 R |
| 2,505,622 | 4/1950 | McKee | 237/1 R |
| 2,581,744 | 1/1952 | Zimmerman | 165/45 X |
| 2,617,597 | 11/1952 | Bonilla | 237/1 R |
| 2,726,067 | 12/1955 | Wetherbee et al. | 165/45 X |
| 3,157,358 | 11/1964 | Birkemeier | 237/1 R |
| 3,195,619 | 7/1965 | Tippmann | 165/1 |
| 3,568,924 | 3/1971 | Chenault | 237/1 |
| 3,782,132 | 1/1974 | Lohoff | 62/260 |
| 3,910,059 | 10/1975 | MacCracken | 62/99 |
| 3,993,122 | 11/1976 | Svenstam | 165/45 |
| 3,995,965 | 12/1976 | Cox | 404/71 |
| 4,132,074 | 1/1979 | Wendel | 60/641 |
| 4,257,239 | 3/1981 | Partin et al. | 62/238.7 |
| 4,258,780 | 3/1981 | Suo | 62/260 |
| 4,305,681 | 12/1981 | Backlund | 404/95 |
| 4,325,228 | 4/1982 | Wolf | 62/260 |
| 4,383,419 | 5/1983 | Bottum | 62/238.6 |
| 4,464,909 | 8/1984 | Litzberg | 62/238.6 X |
| 4,538,673 | 9/1985 | Partin et al. | 165/45 |
| 4,574,875 | 3/1986 | Rawlings et al. | 165/45 |
| 4,646,818 | 3/1987 | Ervin, Jr. | 165/703 |
| 4,693,300 | 9/1987 | Adachi | 165/45 X |
| 4,693,301 | 9/1987 | Baehrle et al. | 165/45 |
| 4,753,285 | 6/1988 | Rawlings | 165/238.7 |
| 4,880,051 | 11/1989 | Ohashi | 165/45 |
| 4,993,483 | 2/1991 | Harris | 165/45 |
| 5,024,553 | 6/1991 | Katsuragi | 165/45 X |

Primary Examiner—Henry A. Bennett
Assistant Examiner—Christopher B. Kilner
Attorney, Agent, or Firm—Dunlap, Codding, Peterson & Lee

[57] ABSTRACT

A ground source air conditioning system for a structure. The system comprises a de-icing conduit array for de-icing nearby surfaces, such as sidewalks, parking lots and driveways. The air conditioning system includes a refrigeration unit, and the heat from the refrigerant in the refrigeration unit is transferred to a heat transfer fluid. The heat transfer fluid is conducted to a heat exchanger, which preferably is located underground, such as an array of vertically or horizontally arranged conduits. Alternately, a water reservoir can be employed as the heat exchanger. When necessary, the heat transfer fluid is conducted through the de-icing conduit array positioned immediately beneath the surface to be de-iced. The amount of heat transfer fluid directed to the de-icing array can be regulated, and in warmer seasons it can be isolated altogether from the rest of the system. The air conditioning system may further include a system which heats or cools the inside of the structure, such as a heat pump, in addition to the refrigeration equipment.

21 Claims, 2 Drawing Sheets

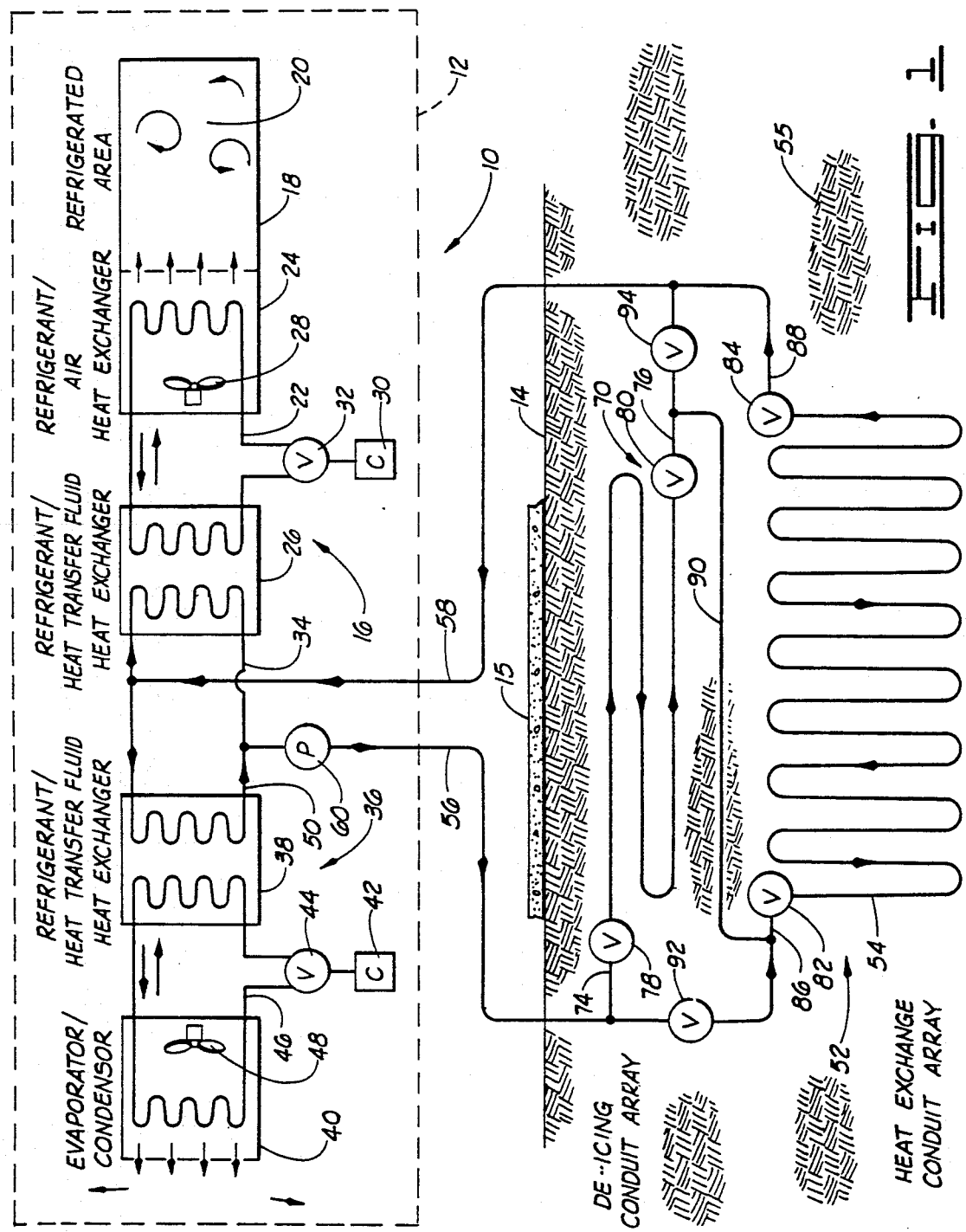

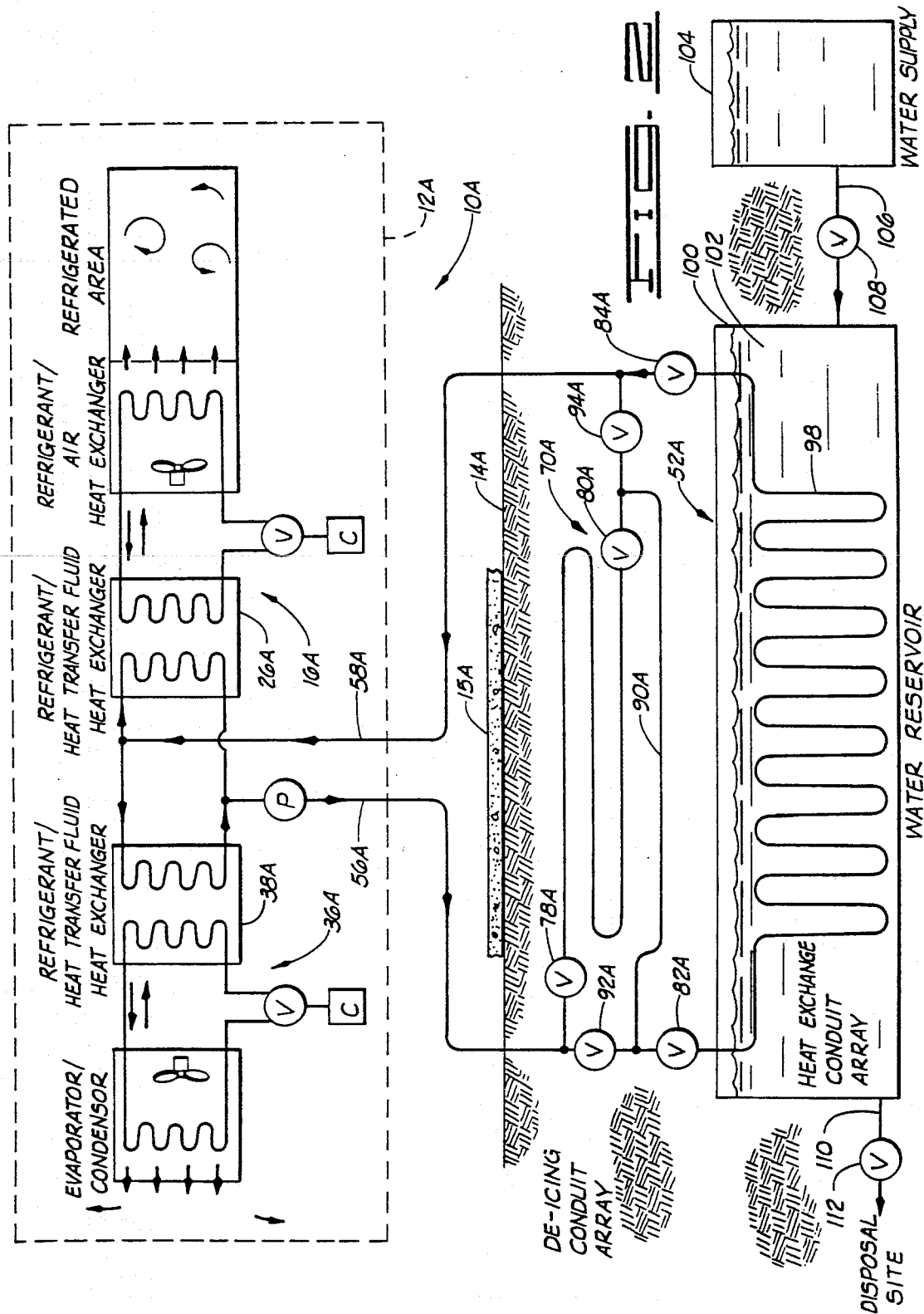

GROUND SOURCE AIR CONDITIONING SYSTEM COMPRISING A CONDUIT ARRAY FOR DE-ICING A NEARBY SURFACE

FIELD OF THE INVENTION

The present invention relates to ground source air conditioning systems.

SUMMARY OF THE INVENTION

The present invention comprises a ground source air conditioning system for a structure having an associated surface which occasionally needs to be de-iced. The system comprises a first air conditioning assembly for refrigerating the air inside a substructure, such as a meat locker, refrigerator or ice maker, which substructure is associated with the structure. The first air conditioning assembly is characterized by circulation of a refrigerant between a first refrigerant/heat transfer fluid heat exchanger and a first refrigerant/air heat exchanger.

The system may include a second air conditioning assembly, such as an air conditioner which simply cools the structure or a heat pump which cools and heats the structure, for conditioning the air inside the structure. The second air conditioning assembly is characterized by circulation of a refrigerant between a second refrigerant/heat transfer fluid heat exchanger and a second refrigerant/air heat exchanger.

The system further comprises a ground source heat exchanger for maintaining the heat transfer fluid near ground temperature. Means is provided for circulating the heat transfer fluid between the ground source heat exchanger and the first refrigerant/heat transfer fluid heat exchanger and, if applicable, the second refrigerant/heat transfer fluid heat exchanger.

Still further, the system comprises a de-icing conduit array positioned near the surface to be de-iced. The de-icing conduit array is adapted for permitting heat from the heat transfer fluid to be transferred to the surface to be de-iced. Means is included for circulating the heat transfer fluid between the first refrigerant/heat transfer fluid heat exchanger and, if applicable, the second refrigerant/heat transfer fluid heat exchanger, and the de-icing conduit array.

BRIEF DESCRIPTION OF THE DRAWINGS

FIG. 1 is diagrammatic representation of an ground source air conditioning system with a conduit array for de-icing a nearby surface, in accordance with the present invention. A heat exchange conduit array is installed in the earth for heat transfer between the heat transfer fluid and the surrounding earth.

FIG. 2 is a diagrammatic representation of another preferred embodiment of the ground source air conditioning system of the present invention. In this embodiment the heat exchange conduit array is submerged in an underground water reservoir supplied by a water well.

DETAILED DESCRIPTION OF THE PREFERRED EMBODIMENTS

With the decreasing availability of fossil fuels and the increasing cost of such fuels as well as electrical power, the need for efficiency in the operation of air conditioning systems becomes more and more important. Ground source refrigeration systems which reject heat into the ground are known. Similarly, ground source heat pumps which utilize underground heat exchange systems to retrieve and to reject heat also are known.

In most instances, ground source heating and cooling systems match the annual seasonal changes. That is, these systems reject heat in summer and drive the heat source temperature up or they extract heat in winter and drive the heat source temperature down. During fall and spring, the installation may operate in both cycles, rejecting heat during the day and extracting heat during the night.

However, this is not the case with refrigeration equipment, such as that used to refrigerate meat lockers and freezers and in ice makers. With the exception of brief periods of operation in the heating mode for the defrost cycle, refrigeration equipment rejects heat continuously into the air.

The present invention provides an air conditioning system which employs the heat rejected by refrigeration equipment to melt ice and snow which accumulates on nearby surfaces, such as sidewalks, parking lots, loading docks and truck ramps. A ground source air conditioning system which makes such positive use of the rejected heat to de-ice nearby surfaces in this manner heretofore has been unknown.

This invention eliminates or greatly decreases the time and expense of manually clearing the surface. Even more importantly, the present invention substantially improves the safety of the environment by keeping ice free those surfaces which support pedestrian and vehicular traffic. As a result, the likelihood of injury to property and to persons is greatly diminished.

With reference now to the drawings in general and to FIG. 1 in particular, there is shown therein a ground source air conditioning system in accordance with the present invention, designated generally by the reference numeral 10. As used herein, "air conditioning system" denotes heating or cooling or both. The term includes systems for regulating the room temperature inside a structure. The term also includes refrigeration equipment, such as ice making machines, freezers and refrigerated meat lockers.

It is to be understood that water source heat pumps, if used in the operation of this invention, may be used with or without heat recovery devices. Heat recovery devices, which are known in the air conditioning industry, divert heat from the refrigerant during operation in the heating or cooling cycle to heat water.

The system 10 is installed in a structure 12, indicated by the broken lines. In most applications the structure 12 will be a commercial establishment with a relatively heavy refrigeration load, such as a grocery store or ice plant.

The structure 12 has at least one associated nearby surface 14 which may require de-icing. As used herein, "de-icing" includes snow and slush removal and melting of ice accumulation. Such surfaces may be covered with a layer of asphalt or concrete 15, and include sidewalks, driveways and parking areas.

Referring still to FIG. 1, the system 10 includes a first air conditioning assembly 16 for refrigerating the air inside a substructure 18 defining a refrigerated area 20. As indicated, the substructure may be a meat locker, a freezer, an ice maker or any other substructure which requires refrigeration. The first air conditioning assembly 16 may be any of several known models of refrigeration equipment and will vary according to the nature of the substructure. Preferably, the substructure 18 will be one which utilizes substantially continuous refrigeration, except for brief defrosting periods.

In any event the first air conditioning assembly preferably is characterized by circulation of a refrigerant through a conduit 22 in a closed loop between a first refrigerant/air heat exchanger 24 and a first refrigerant/heat transfer fluid heat exchanger 26.

In the first refrigerant/air heat exchanger 24, heat in the refrigerated area 20 is absorbed by the refrigerant. The air chilled by this process typically is distributed throughout the refrigerated area by a blower 28 of some sort.

The refrigerant typically is circulated by means of a compressor 30. A defrost cycle usually is provided for by incorporating a reversing valve 32 in the conduit. In this way the refrigerant can be caused to flow in both directions, as indicated by the arrows.

In the first refrigerant/heat transfer fluid heat exchanger 26, the heat in the refrigerant is transferred to a heat transfer fluid. Preferably the heat transfer fluid is water or a water solution containing antifreeze and is carried in a conduit 34 which connects to a ground source heat exchanger and the de-icing conduit array yet to be described.

Although not required, in many instances it will be advantageous to incorporate a second air conditioning assembly 36 into the system 10. The second air conditioning assembly 36 conditions the air inside the structure 12. While the second air conditioning assembly may be a conventional water source air cooling system, it is preferable to employ a reversible ground source heat pump capable of cooling and warming the air inside the structure.

The second air conditioning assembly 36 is characterized by circulation of a refrigerant between a second refrigerant/heat transfer fluid heat exchanger 38 and a second refrigerant/air heat exchanger 40. It will be understood that in the case of a heat pump, the second refrigerant/air heat exchanger 40 is the evaporator/condenser component. A compressor 42 and a reversing valve 44 preferably also are included, so that the refrigerant carried by the conduit 46 can flow bi-directionally as indicated by the arrows for heating and cooling cycles. A blower 48 of some sort usually is included for distributing the conditioned air into the interior of the structure 12. The heat transfer fluid is carried to and from the second heat transfer fluid/refrigerant heat exchanger 38 by a conduit 50.

With continuing reference to FIG. 1, the system 10 further comprises a ground source heat exchanger 52 for maintaining the heat transfer fluid within a range near ground temperature. It will be appreciated that "ground temperature" is not perfectly constant. Yet, it is known that for the first 200 feet of the earth's surface the ground temperature remains relatively stable, regardless of the weather. For example, in Stillwater, Oklahoma, the average ground temperature is relatively constant year round at about 62 degrees. Accordingly, the earth can serve to absorb heat or to contribute heat in a ground source air conditioning system.

The ground source heat exchanger 52 comprises a heat exchange conduit array 54 in fluid communication with the first heat transfer fluid/refrigerant heat exchanger, and where applicable also the second heat transfer fluid/refrigerant heat exchanger. For this purpose the system 10 includes a supply line 56 and a return line 58.

The configuration and construction of the conduit array 54 may vary. Preferably, the conduits are formed of high density polybutylene or polyethylene pipe, which is inert, noncorrosive and very flexible. The pipes of the conduit array 54 should be sized and spaced so as to accommodate the heat rejection capabilities of the refrigeration equipment employed in a given application of the invention.

The pipes may be configured in either a series arrangement, where all fluid travels through all the pipe in a continuous single flow path. Alternately, the pipe may be configured in a parallel arrangement, where fluid flows through different branches in the pipe simultaneously.

The pipes may be arranged vertically or horizontally. Horizontal applications normally are installed in trenches 4 to 6 feet deep. Vertical conduits typically are installed in bore holes having a depth of 100 feet or more.

One underground conduit array which may employed advantageously as the ground source heat exchanger 52 in the system 10 is described in U.S. Pat. No. 4,257,239, entitled "Earth Coil Heating and Cooling System." Other suitable piping installations are described in U.S. Pat. No. 4,753,285, entitled "Parallel Piping Installation with Air By-Pass Apparatus," U.S. Pat. No. 5,538,673, entitled "Drilled Well Series and Paralleled Heat Exchange Systems," and U.S. Pat. No. 4,574,875, entitled "Heat Exchanger for Geothermal Heating and Cooling Systems." The contents of these patents are incorporated herein by reference.

The heat exchange conduit array is positioned in contact with earth or water at ground temperature under conditions which permit heat to be exchanged between the heat transfer fluid in the conduit and the surrounding earth or water. In the embodiment shown in FIG. 1, the conduit array 54 is buried in the ground in a known manner. In this way, heat is exchanged between the heat transfer fluid in the conduit and the surrounding earth 59.

One or more pumps 60 are provided for circulating the heat transfer fluid though the conduits between the first and second refrigerant/heat transfer fluid heat exchangers 16 and 36, the heat exchange conduit array 54, and the de-icing conduit array to which attention now is directed.

The de-icing conduit array 70 is positioned near the surface 14 to be de-iced so that heat from the heat transfer fluid in the de-icing conduit array is transmitted to the surface. Where the surface is a sidewalk, parking area or driveway, the de-icing conduit array 70 preferably is positioned in a plurality of closely spaced, shallow trenches in the earth immediately below the surface of asphalt or concrete 15.

The entry end 74 of the de-icing conduit array 70 connects to the supply line 56. Similarly, the exit end 76 of the de-icing conduit array 70 connects to the return line 58.

Valves 78 and 80 preferably are included for controlling the flow of heat transfer fluid to the de-icing conduit array 70. Thus, in warm seasons when de-icing is not required, the valves 78 and 80 may be closed to isolate the array 70.

It is recommended also to include valves 82 and 8 at the entry end 86 and exit end 88, respectively, of the ground source heat exchanger 5 for controlling the flow of heat transfer fluid therethrough. Thus, the heat exchanger 52 can be isolated by closing the valves 82 and 84.

A bypass line 90 may be provided for connecting the exit end 76 of the de-icing conduit array 70 and the entry end 86 of the ground source heat exchanger 52. Where such a bypass line 90 is used, valves 92 and 94 should be included between the connection of the bypass line and the supply and return lines 56 and 58, respectively.

The bypass line and the valves provide alternative fluid paths making the system more versatile. For example, fluid can be caused to flow in series first through the de-icing conduit array 70 and then through the heat exchange conduit array 54 by opening valves 78, 80, 82 and 84 and closing valves 92 and 94. The conduit arrays 70 and 54 can be operated in parallel by opening all the valves.

Turning now to FIG. 2, there is shown therein a second embodiment of the present invention. The system 10A of this embodiment is similar to the system 10 of the previously described embodiment.

The air conditioning system 10A comprises a first air conditioning assembly 16A and may also include a second air conditioning assembly 36A. A similar de-icing conduit array 70A also is provided. The system 10A further comprises a ground source heat exchanger 52 for maintaining the heat transfer fluid within a range near ground temperature.

In this embodiment, the ground source heat exchanger comprises a heat exchange conduit array which is a system of pipes supported in a body of water maintained near ground temperature. However, it will be understood that other types of heat exchangers, such as plate-to-plate heat exchangers, may be employed in lieu of the submerged pipe system.

With more particular reference now to the embodiment of FIG. 2, the ground source heat exchanger 52A comprises a conduit array 98 supported in a vessel, such as the tank 100, for containing a reservoir of water 102. The tank 100 may be underground or above ground.

The heat exchange conduit array 98 is in fluid communication with the first and second refrigerant/heat transfer fluid heat exchangers 26A and 38A of the system 10A, via the supply and return lines 56A and 58A, as in the previous embodiment. The construction of the conduit array 98 is known and therefore will not be described in detail here. Generally, the vessel and the heat exchange conduit array 98 are adapted for permitting the transfer of heat between the heat transfer fluid in the heat exchange conduit array and the water reservoir. It will appreciated that the vessel and conduit array 98 should be sized to accommodate the heat rejection capabilities of the refrigeration equipment employed in a given application of the invention.

The water reservoir must be maintained near ground temperature. To this end, the system 10A further comprises a source of ground temperature water for adding to the water reservoir 102 in the tank 100. The water source may be an underground water well 104, as shown. Other suitable water sources include a nearby lake or other source of surface water and in some instance a potable water supply.

The water well 104, or other ground water source, is connected to the tank 100 by a conduit 106 for transferring water to the tank. A valve 108 should be included for controlling the transfer of water through the conduit 106. The valve 108 is controlled thermostatically, having means provided for sensing the water temperature and for adding water to the tank 100 should the water temperature exceed or fall below a predetermined temperature parameter.

A discharge line 110 is provided for removing water from the tank 100. The discharge line 110 preferably leads to a suitable site for disposing of the water, such as a nearby lake. A valve 112 is included for controlling the discharge of water from the tank 100. The valve 112 is controlled in parallel with the valve 108 or by sensing the water level or the water pressure in the tank 100.

Control of the temperature of the water reservoir 102 is accomplished by discharging a portion of the water reservoir through the discharge line 110 and replacing the discharged water with ground temperature water from the water well 104. Thus, the water reservoir 102 provides a well controlled heat exchange environment for the conduit array 98.

As in the previous embodiment, a bypass line 90A preferably is provided. Likewise valves 78A, 80A, 82A, 84A, 92A and 94A are included for controlling the path of the heat transfer fluid through the de-icing conduit array 70A and through the heat exchange conduit array 98.

Now it will be appreciated that the present invention provides an economical installation for utilizing the heat produced by refrigeration units which heretofore has been wasted. The us of this heat to de-ice walkways and driving surfaces eliminates the cost of the labor otherwise required to maintain these surfaces in a safe condition. Furthermore, the de-icing produced by the system of the present invention can be regulated automatically so that intermittent accumulations of ice and snow do not occur, as would be the case where only manual removal is employed.

Still further, the use of salt or salt and sand mixtures to de-ice surfaces is reduced or eliminated. This in turn decreases the damage to vehicles and nearby plants and trees caused by such substances.

Changes may be made in the combination and arrangement of the various parts, elements, steps and procedures described herein without departing from the spirit and scope of the invention as defined in the following claims.

What is claimed is:

1. A ground source air conditioning system for a structure having an associated surface to be de-iced, the system comprising:

a first air conditioning assembly for refrigerating the air inside a substructure associated with the structure, wherein the first air conditioning assembly is characterized by circulation of a refrigerant between a first refrigerant/heat transfer fluid heat exchanger and a first refrigerant/air heat exchanger;

a second air conditioning assembly for conditioning the air inside the structure, wherein the second air conditioning assembly is characterized by circulation of a refrigerant between a second refrigerant/heat transfer fluid heat exchanger and a second refrigerant/air heat exchanger;

a ground source heat exchanger for maintaining the heat transfer fluid near ground temperature;

means for circulating a heat transfer fluid between the the ground source heat exchanger and the first and second refrigerant/heat transfer fluid heat exchangers;

a de-icing conduit array positioned near the surface to be de-iced so that heat from heat transfer fluid in the de-icing conduit array is transmitted to the surface; and means for circulating heat transfer fluid between the first and second refrigerant/heat transfer fluid heat exchangers and the de-icing conduit array.

2. The ground source air conditioning system of claim 1 wherein the ground source heat exchanger comprises a heat exchange conduit array in fluid communication with the first and second refrigerant/heat transfer fluid heat exchangers, the heat exchange conduit array being installed in the earth and adapted for permitting the transfer of heat between the heat transfer fluid and the surrounding earth.

3. The ground source air conditioning system of claim 2 wherein the heat exchange conduit array is vertically arranged.

4. The ground source air conditioning system of claim 2 wherein the heat exchange conduit array is horizontally arranged.

5. The ground source air conditioning system of claim 2 further comprising a plurality of valves by which the path of the heat transfer fluid through the de-icing conduit array and through the heat exchange conduit array can be controlled.

6. The ground source air conditioning system of claim 2 further comprising a bypass conduit connecting the exit end of the de-icing conduit array and the entry end of the heat exchange conduit array.

7. The ground source air conditioning system of claim 1 wherein the second air conditioning assembly is a reversible heat pump capable of cooling or warming the air inside the structure.

8. The ground source air conditioning system of claim 1 wherein the ground source heat exchanger comprises:
a vessel for containing a reservoir of water;
a source of ground temperature water for adding to the reservoir of water in the vessel;
means for removing and disposing of water from the vessel;
means for transferring water from the water source to the vessel;
wherein the water removal and disposal means and the water transferring means are operable to maintain the water reservoir at about ground temperature;
a heat exchange conduit array in fluid communication with the first and second refrigerant/heat transfer fluid heat exchangers; and
wherein the heat exchange conduit array and the vessel are adapted for permitting the transfer of heat between the heat transfer fluid in the heat exchange conduit array and the water in the vessel.

9. The ground source air conditioning system of claim 8 further comprising a plurality of valves by which the path of the heat transfer fluid through the de-icing conduit array and through the heat exchange conduit array can be controlled.

10. The ground source air conditioning system of claim 8 further comprising a bypass conduit connecting the exit end of the de-icing conduit array to the entry end of the heat exchange conduit array.

11. The ground source air conditioning system of claim 8 wherein the heat exchange conduit array is a system of pipes supported in the vessel.

12. A ground source air conditioning system for a structure having an associated surface to be de-iced, the system comprising
an air conditioning assembly for refrigerating the air inside a substructure associated with the structure, wherein the air conditioning assembly is characterized by circulation of a refrigerant between a refrigerant/heat transfer fluid heat exchanger and a refrigerant/air heat exchanger;
a ground source heat exchanger for maintaining the heat transfer fluid near ground temperature;
means for circulating water between the ground source heat exchanger and the refrigerant/heat transfer fluid heat exchanger;
a de-icing conduit array positioned near the surface to be de-iced s that heat from the heat transfer fluid in the de-icing conduit array is transmitted to the surface; and
means for circulating water between the refrigerant-/heat transfer fluid heat exchanger and the de-icing conduit array.

13. The ground source air conditioning system of claim 12 wherein the ground source heat exchanger comprises a heat exchange conduit array in fluid communication with the refrigerant/heat transfer fluid heat exchanger, wherein the heat transfer fluid conduit array is installed in the earth and adapted for permitting the transfer of heat between the heat transfer fluid and the surrounding earth.

14. The ground source air conditioning system of claim 13 wherein the heat exchange conduit array is vertically arranged.

15. The ground source air conditioning system of claim 13 wherein the heat exchange conduit array is horizontally arranged.

16. The ground source air conditioning system of claim 13 further comprising a plurality of valves by which the path of the heat transfer fluid through the de-icing conduit array and through the ground source heat exchanger can be controlled.

17. The ground source air conditioning system of claim 13 further comprising a bypass conduit connecting the exit end of the de-icing conduit array to the entry end of the heat exchange conduit array.

18. The ground source air conditioning system of claim 12 wherein the ground source heat exchanger comprises:
a vessel for containing a reservoir of water;
a source of ground temperature water for adding to the reservoir of water in the vessel;
means for removing and disposing of water from the vessel;
means for transferring water from the water source to the vessel;
wherein the water removal and disposal means and the water transferring means are operable to maintain the water reservoir near ground temperature;
a heat exchange conduit array in fluid communication with the refrigerant/heat transfer fluid heat exchanger; and
wherein the heat exchange conduit array and the vessel are adapted for permitting the transfer of heat between the heat transfer fluid in the heat exchange conduit array and the water in the vessel.

19. The ground source air conditioning system of claim 18 further comprising a plurality of valves by which the path of the heat transfer fluid through the de-icing conduit array and through the ground source heat exchanger can be controlled.

20. The ground source air conditioning system of claim 18 further comprising a bypass conduit connecting the exit end of the de-icing conduit array to the entry end of the heat exchange conduit array.

21. The ground source air conditioning system of claim 18 wherein the heat exchange conduit array is a system of pipes supported in the vessel.

* * * * *

UNITED STATES PATENT AND TRADEMARK OFFICE
CERTIFICATE OF CORRECTION

PATENT NO. : 5,081,848

DATED : January 21, 1992

INVENTOR(S) : John P. Rawlings

It is certified that error appears in the above-identified patent and that said Letters Patent is hereby corrected as shown below:

Col. 4, line 65, please delete the numeral "8" and substitute therefor the numeral --84--.

Col. 4, line 67, please delete the numeral "5" and substitute therefor the numeral --52--.

Col. 5, line 26, please delete the numeral "52" and substitute therefor the numeral --52A--.

Col. 5, line 50, immediately following the word "will", please insert the word --be--.

Col. 6, line 27, please delete the word "us" and substitute therefor the word --use--.

UNITED STATES PATENT AND TRADEMARK OFFICE
CERTIFICATE OF CORRECTION

PATENT NO. : 5,081,848

DATED : January 21, 1992

INVENTOR(S) : John P. Rawlings

It is certified that error appears in the above-identified patent and that said Letters Patent is hereby corrected as shown below:

Col. 8, line 10, please delete the letter "s" and substitute therefor the word --so--.

Signed and Sealed this

Twenty-fifth Day of May, 1993

Attest:

MICHAEL K. KIRK

*Attesting Officer*   *Acting Commissioner of Patents and Trademarks*

UNITED STATES PATENT AND TRADEMARK OFFICE
CERTIFICATE OF CORRECTION

PATENT NO. : 5,081,848
DATED : January 21, 1992
INVENTOR(S) : John P. Rawlings and Michael E. Albertson It is certified that error appears in the above-indentified patent and that said Letters Patent is hereby corrected as shown below:

Column 8, line 6, delete "water" and insert
    --heat transfer fluid--

Signed and Sealed this

Seventh Day of October, 1997

Attest:

BRUCE LEHMAN

*Attesting Officer*    *Commissioner of Patents and Trademarks*